July 4, 1933.  J. G. BREWER  1,916,654
BRAKE OPERATING MECHANISM
Filed Oct. 6, 1931
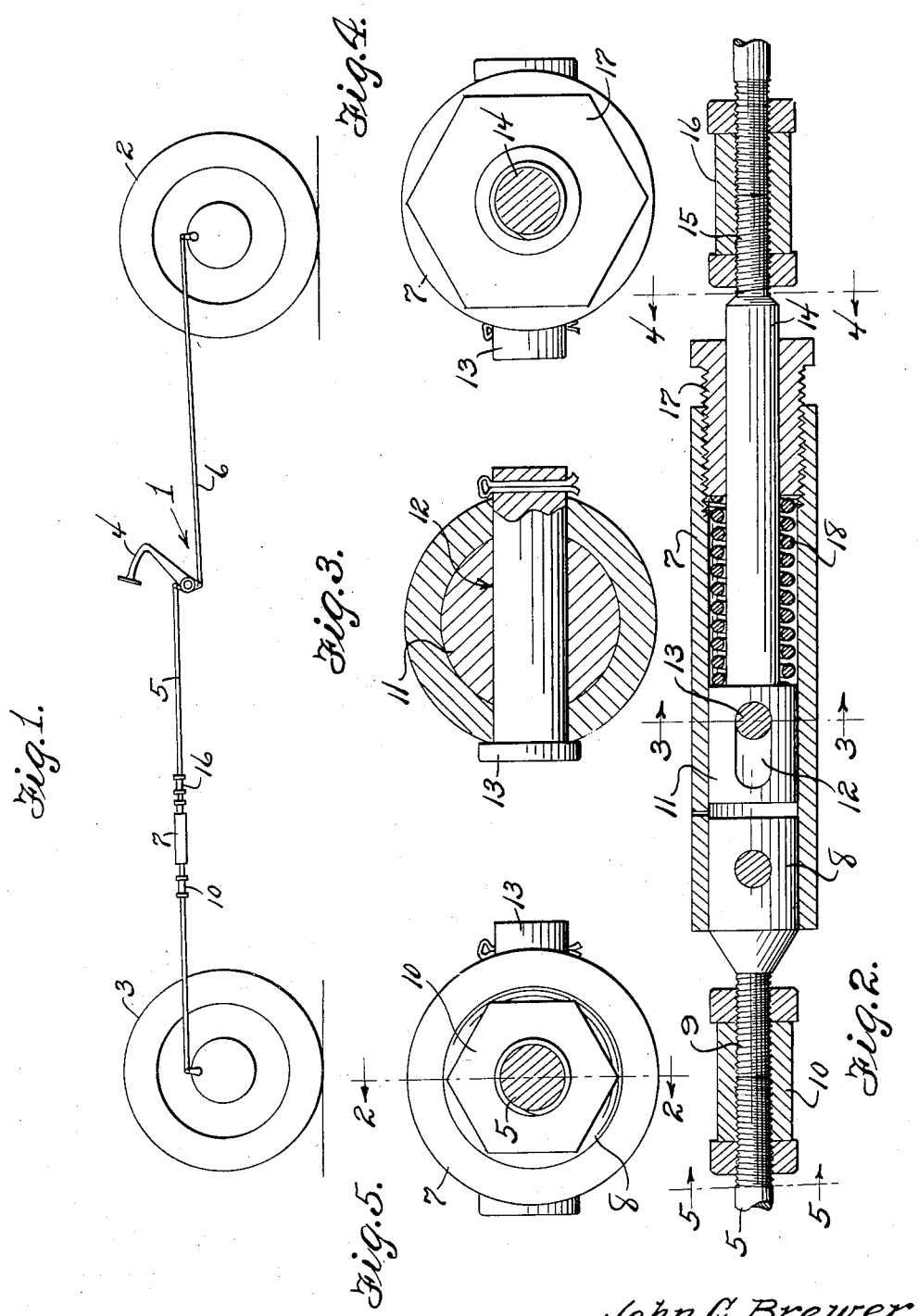
John G. Brewer
INVENTOR
BY Victor J. Evans
and Co. ATTORNEY Patented July 4, 1933

1,916,654

UNITED STATES PATENT OFFICE

JOHN G. BREWER, OF NEW ORLEANS, LOUISIANA

BRAKE OPERATING MECHANISM

Application filed October 6, 1931. Serial No. 567,241.

This invention relates to an operating means for mechanical four wheel brakes of motor vehicles and has for the primary object, the provision of means for permitting the application of rear brakes or the brakes of the drive wheels of the vehicle in advance of the application of the front brakes or the brakes of the driven wheels, and after a predetermined application of the rear brakes to apply the front brakes to bring the vehicle to a quick stop with a maximum amount of safety and as the front or driven wheels are the last to receive braking action permits said front wheels to freely act under the influence of the steering mechanism and also permits the lowering of the center of gravity of the body of the vehicle due to the application of the brakes to first take place at the rear end of the vehicle for reducing skidding to a minimum.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a diagrammatical view illustrating mechanical four wheel brake rigging with my invention applied thereto.

Figure 2 is a sectional view illustrating the equalizing device constructed in accordance with my invention.

Figure 3 is a sectional view taken on the line 3—3 of Figure 2.

Figure 4 is a sectional view taken on the line 4—4 of Figure 2.

Figure 5 is a sectional view taken on the line 5—5 of Figure 2.

Referring in detail to the drawing, the numeral 1 indicates a brake rigging for actuating the front and rear brakes of front and rear wheels 2 and 3 of a motor vehicle and includes the usual brake pedal 4 associated or connected with the brake rods 5 and 6. A brake rigging of this character is adapted to apply the front and rear brakes simultaneously with the same force and as this interferes with the steering of the front wheels it has caused numerous accidents and to overcome this disadvantage my invention is applied to the rear brake rod or rods 5 and comprises a tubular casing 7 having a head 8 secured in one end and provided with a screw threaded shank 9 connected to one section of the brake rod by a coupling 10. A head 11 is provided with an elongated slot 12 to receive a bolt 13 passing through the casing 7 for permitting the head 11 to have a limited sliding movement relative to the casing. The head 11 is formed integral with a stem or rod 14 provided with a screw threaded shank 15 located exteriorly of the casing and adapted to be connected to the other section of the rear brake rod 5 by a coupling 16. A bushing 17 is provided in the casing 7 and slidably receives the stem or rod 14 and forms a seat for one end of a coiled spring 18 while the opposite end of the spring bears against the head 11 for normally positioning the head 11 so that the pin 13 is located at one end of the slot 12.

To employ my invention with an ordinary brake rigging of the four wheel type the front brake shoes or bands are adjusted further away from their drums than the rear brake shoes or bands with respect to their drums, so that during the application of the brakes, the rear brakes take effect prior to the front brakes. However, to prevent further application of the rear brakes during the application of the front brakes my invention is employed as heretofore described. The initial movement of the foot pedal 4 from a non-brake applying position applies the rear brakes with sufficient force to bring about a gradual stopping of the vehicle. The resistance of the spring 18 is sufficient to prevent movement of the head 11 relative to the casing 7 so that normal application of the rear brakes may be had. Further movement of the brake pedal to cause application of the front brakes, the resistance of the spring 18 is overcome which permits the head to move relative to the casing 7 by the pin 13 traveling in the slot 12. The head moving relative to the casing prevents further application of the rear brakes and obviates the possibility of locking the rear wheels during the application of the front brakes, said application of the front brakes with the already applied rear brakes will bring the vehicle to a sudden stop. The length of the slot 12 permits the pin 13 to travel sufficiently relative to the head 11 for the application of the front brakes after the initial application of the rear brakes without further application of said rear brakes.

While I have shown and described the preferred embodiment of my invention, it will be understood that minor changes in construction, combination and arrangement of parts may be made without departing from the spirit and scope of my invention, as claimed.

Having thus described my invention, what I claim is:

In combination with a four wheel brake mechanism having the front brake shoes thereof adjusted further from their drums than the rear brake shoes with respect to their drums to permit the rear brakes to take effect prior to the front brakes, a cylinder connected to the rear brakes, a stem connected to the operating medium of the brake mechanism and slidably received in the cylinder, a head on the stem and having a slot, a pin secured in the cylinder and extending through the slot to connect the stem to the cylinder for a limited sliding movement relative to said cylinder, and a coiled spring between the head and cylinder having tension sufficient to prevent sliding of the stem relative to the casing during the initial movement of the operating medium of the brake mechanism for applying the rear brakes with normal braking action, said spring yielding to prevent further application of the rear brakes during continued movement of the operating medium of the brake mechanism for applying the front brakes.

In testimony whereof I affix my signature.

JOHN G. BREWER.